Figure 1:
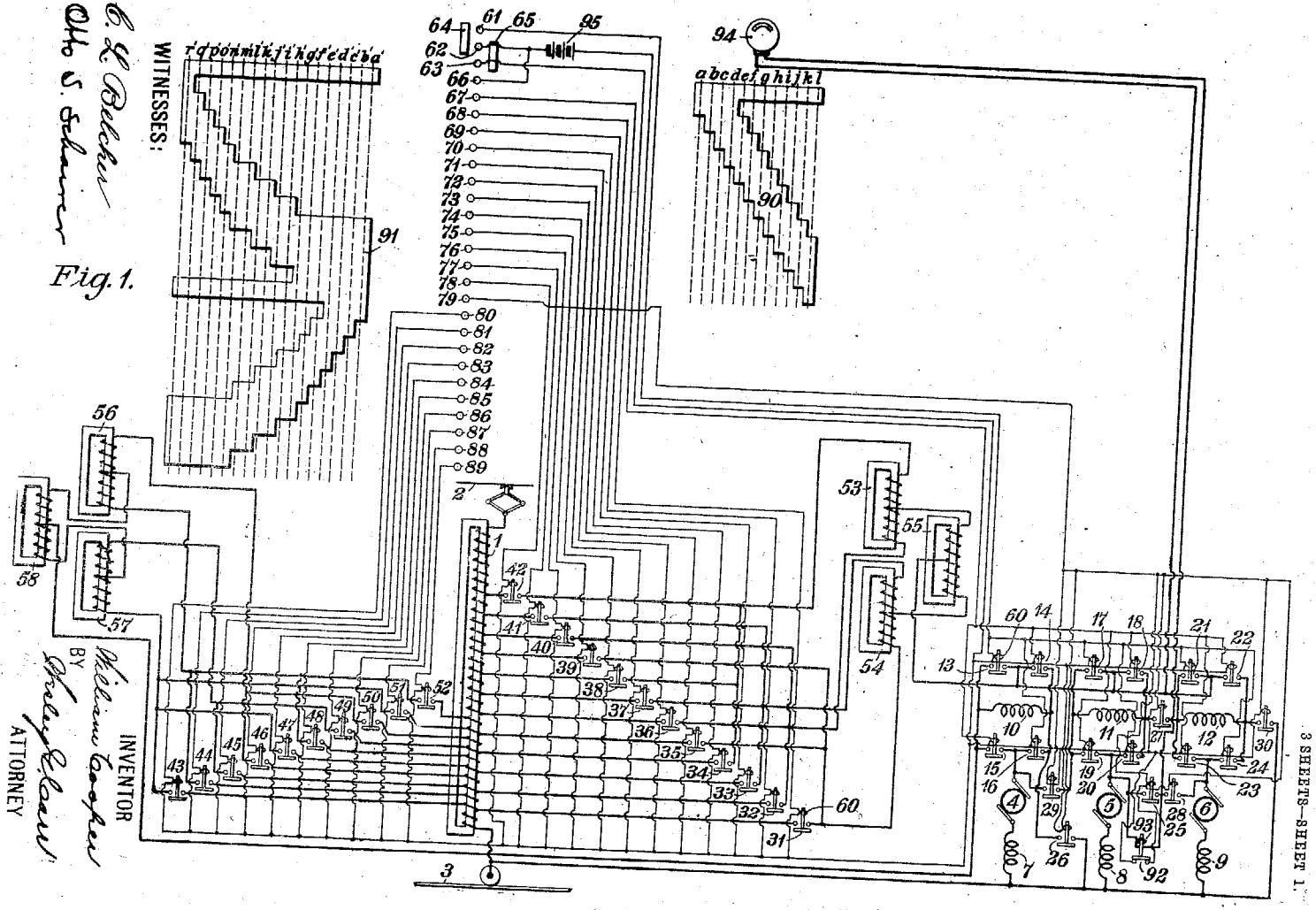

W. COOPER.

REGENERATIVE SYSTEM OF CONTROL.

APPLICATION FILED MAR. 2, 1910.

Reissued May 17, 1910.

13,115.

3 SHEETS—SHEET 1.

WITNESSES:

C. L. Belcher

Otto S. Schairer

INVENTOR

William Cooper

BY

Wesley G. Carr

ATTORNEY

W. COOPER.

REGENERATIVE SYSTEM OF CONTROL.

APPLICATION FILED MAR. 2, 1910.

Reissued May 17, 1910.

13,115.

3 SHEETS—SHEET 2.

*Fig. 2.*

| | 25 | 26 | 27 | 28 | 29 | 30 | 43 | 44 | 45 | 46 | 47 | 48 | 49 | 50 | 51 | 52 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|
| a′ | | ○ | ○ | | ○ | ○ | ○ | | | | | | | | | | | | | | | | | | | | | |
| b′ | | ○ | ○ | | ○ | ○ | ○ | ○ | | | | | | | | | | | | | | | | | ○ | ○ | ○ | ○ |
| c′ | | ○ | ○ | | ○ | ○ | ○ | ○ | ○ | | | | | | | | | | | | | | | | ○ | ○ | ○ | ○ |
| d′ | | ○ | ○ | | ○ | ○ | ○ | ○ | ○ | ○ | | | | | | | | | | | | | | | ○ | ○ | ○ | ○ |
| e′ | | ○ | ○ | | ○ | ○ | | ○ | ○ | ○ | ○ | | | | | | | | | | | | | | ○ | ○ | ○ | ○ |
| f′ | | ○ | ○ | | ○ | ○ | | | ○ | ○ | ○ | ○ | | | | | | | | | | | | | ○ | ○ | ○ | ○ |
| g′ | | ○ | ○ | | ○ | ○ | | | | ○ | ○ | ○ | ○ | | | | | | | | | | | | ○ | ○ | ○ | ○ |
| h′ | | ○ | ○ | | ○ | ○ | | | | ○ | ○ | ○ | ○ | | | | | | | | | | | | ○ | ○ | ○ | ○ |
| i′ | | ○ | ○ | | ○ | ○ | | | | | ○ | ○ | ○ | ○ | | | | | | | | | | ○ | ○ | ○ | ○ | |
| j′ | | ○ | ○ | | ○ | ○ | | | | | ○ | ○ | ○ | ○ | | | | | | | | | | ○ | ○ | ○ | ○ | ○ |
| k′ | | ○ | ○ | | ○ | ○ | | | | | | ○ | ○ | ○ | ○ | | | | | | | | ○ | ○ | ○ | ○ | | |
| l′ | | ○ | ○ | | ○ | ○ | | | | | | ○ | ○ | ○ | ○ | | | | | | | | ○ | ○ | ○ | ○ | | |
| m′ | | ○ | ○ | | ○ | ○ | | | | | | | ○ | ○ | ○ | ○ | | | | | | ○ | ○ | ○ | ○ | | | |
| n′ | | ○ | ○ | | ○ | ○ | | | | | | | ○ | ○ | ○ | ○ | | | | | ○ | ○ | ○ | ○ | ○ | | | |
| o′ | | ○ | ○ | | ○ | ○ | | | | | | | ○ | ○ | ○ | ○ | | | | ○ | ○ | ○ | ○ | ○ | | | | |
| p′ | | ○ | ○ | | ○ | ○ | | | | | | | ○ | ○ | ○ | ○ | | | ○ | ○ | ○ | ○ | | | | | | |
| q′ | | ○ | ○ | | ○ | ○ | | | | | | | ○ | ○ | ○ | ○ | | ○ | ○ | ○ | ○ | | | | | | | |
| r′ | | ○ | ○ | | ○ | ○ | | | | | | | ○ | ○ | ○ | ○ | ○ | ○ | ○ | ○ | | | | | | | | |

*Fig. 3.*

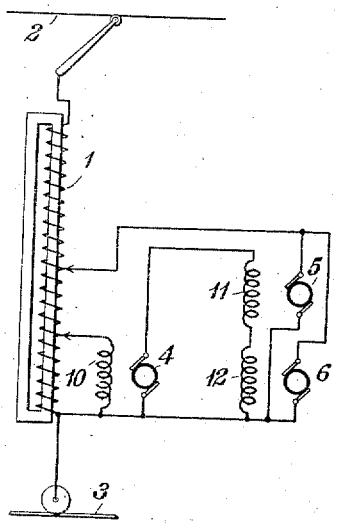

*Fig. 5.*

| 25 | 26 | 27 | 28 | 29 | 30 | 106 | 107 | 108 | 109 | 110 | 101 | 102 | 103 | 104 | 105 |
|---|---|---|---|---|---|---|---|---|---|---|---|---|---|---|---|
| | ○ | ○ | | ○ | ○ | ○ | | | | | | | | | ○ |
| | ○ | ○ | | ○ | ○ | | ○ | | | | | | | | ○ |
| | ○ | ○ | | ○ | ○ | | | ○ | | | | | | | ○ |
| | ○ | ○ | | ○ | ○ | | | ○ | | | | | | ○ | |
| | ○ | ○ | | ○ | ○ | | | | ○ | | | | | ○ | |
| | ○ | ○ | | ○ | ○ | | | | ○ | | | | ○ | | |
| | ○ | ○ | | ○ | ○ | | | | | ○ | | | ○ | | |
| | ○ | ○ | | ○ | ○ | | | | | ○ | | ○ | | | |
| | ○ | ○ | | ○ | ○ | | | | | ○ | ○ | | | | |

WITNESSES:

C. L. Belcher

Otto J. Schairer

INVENTOR

William Cooper

BY

Wheeler & Coors

ATTORNEY

W. COOPER.

REGENERATIVE SYSTEM OF CONTROL.

APPLICATION FILED MAR. 2, 1910.

Reissued May 17, 1910.

13,115.

3 SHEETS—SHEET 3.

WITNESSES:

C. L. Belcher

Otto J. Schauer

INVENTOR

William Cooper

BY

Shelby Clark

ATTORNEY

UNITED STATES PATENT OFFICE.

WILLIAM COOPER, OF PITTSBURG, PENNSYLVANIA, ASSIGNOR TO WESTINGHOUSE ELECTRIC & MANUFACTURING COMPANY, A CORPORATION OF PENNSYLVANIA.

REGENERATIVE SYSTEM OF CONTROL.

13,115. Specification of Reissued Letters Patent. Reissued May 17, 1910.

Original No. 889,908, dated June 9, 1908, Serial No. 391,226. Application for reissue filed March 2, 1910. Serial No. 546,971.

*To all whom it may concern:*

Be it known that I, WILLIAM COOPER, a citizen of the United States, and a resident of Pittsburg, in the county of Allegheny and State of Pennsylvania, have invented a new and useful Improvement in Regenerative Systems of Control, of which the following is a specification.

My invention relates to systems of control for electric railway motors, and particularly to systems in which the motors may be converted into generators to effect braking and to restore power to the distributing circuit.

The object of my invention is to provide a system of control in which alternating current motors of the commutator type of construction may be caused to operate as generators and supply substantially a constant amount of current to the distributing circuit irrespective of the speed of the motors.

A further object is to prevent the motors from being connected to the distributing circuit except when the electromotive forces generated thereby are approximately equal to that of the distributing circuit.

If the field magnet winding of an alternating current motor of the commutator type is separately excited, the electromotive force generated by the armature is approximately 90° out of phase with the electromotive force applied to the field magnet winding. For this reason, it has been proposed to utilize one of the motors upon a railway vehicle as an exciter for the remaining motors, the field magnet winding of the exciter being connected between suitable points in a subdivided main transformer, while the exciter armature is connected to the field magnet windings of the remaining motors, the armatures of which are connected between suitable points in the main transformer. It will be understood that the object of such an arrangement is to cause the generated electromotive force to be nearly or approximately of the same phase as that of the distributing circuit. As the speeds of the machines decrease or vary, the generated electromotive force may be maintained substantially equal to that between the points in the main transformer to which the generator armatures are connected by adjusting the voltage applied to the field magnet winding of the exciter or by altering the connections between the generator armatures and the main transformer. In the present system, the armatures of the motors acting as generators may not be connected to the transformer unless the generated electromotive force equals the transformer electromotive force, and, in order that the maximum braking effect may be obtained without overloading or unduly heating the motors, the electromotive force applied to the exciter field magnet winding and the connections of the armatures of the remaining machines with the main transformer are so adjusted with respect to each other that the current supplied to the distributing circuit is maintained substantially constant, irrespective of the speed of operation.

Figure 4:
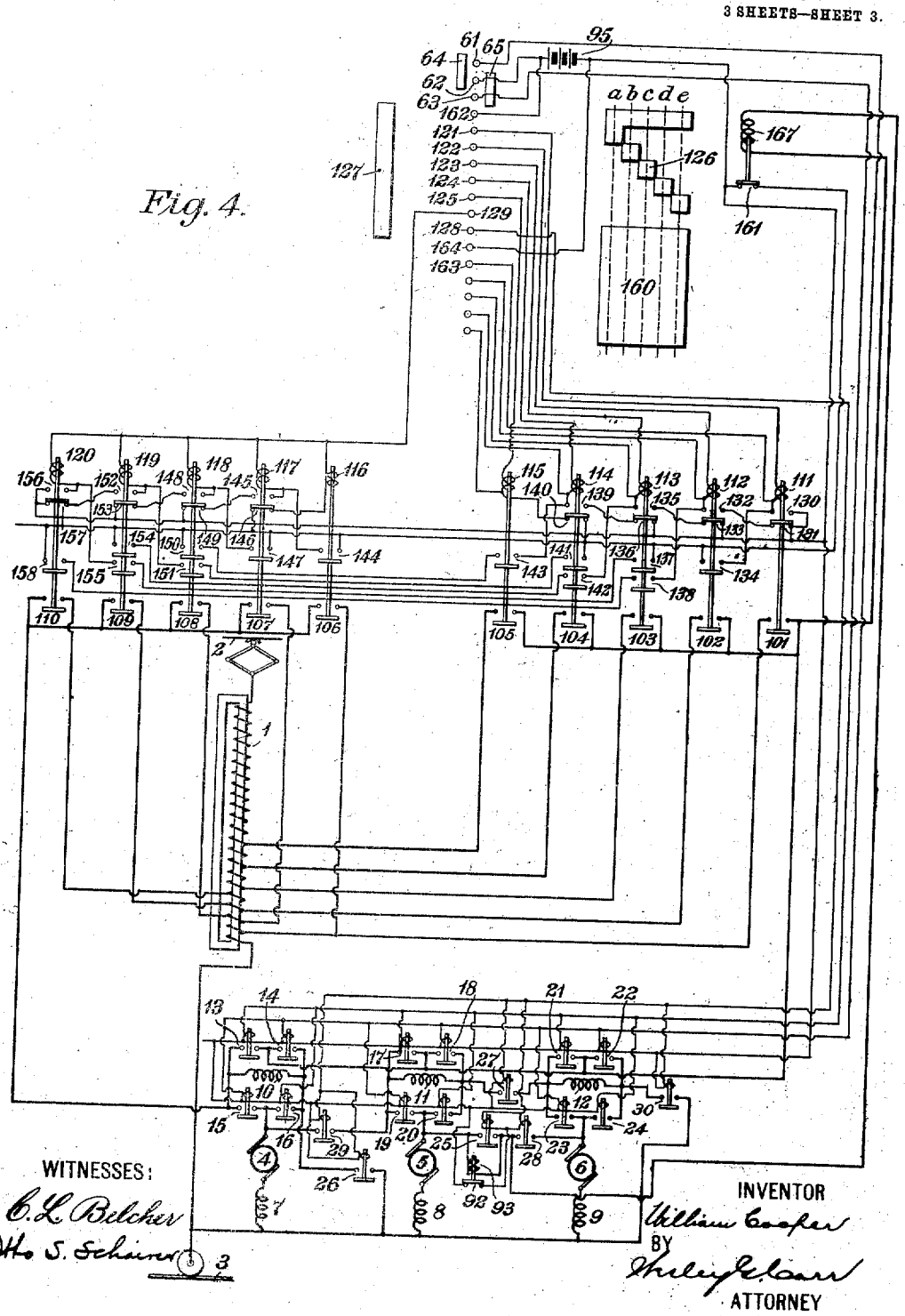

Figure 1, of the accompanying drawings, is a diagrammatic view of a system of control that embodies my invention. Fig. 2 is a chart giving the order of closure of the switches of the aid system. Fig. 3 is a simplified diagrammatic view of the arrangement of the main circuits of the system when the motors are operated as generators. Fig. 4 is a diagrammatic view of a modification of the system of Fig. 1, and Fig. 5 is a chart giving the order of closure of the switches in the system of Fig. 4.

The system comprises a main, subdivided auto-transformer winding 1 that is supplied from any suitable circuit, such as a trolley conductor 2 and a track rail 3 of a railway system; three motors of the commutator type of construction having armatures 4, 5 and 6, respectively, compensating windings 7, 8 and 9, respectively, and field magnet windings 10, 11 and 12, respectively; a set of switches 13 to 24, inclusive, for governing the direction of rotation of the motors; another set of switches 25 to 30, inclusive, for governing the circuit arrangement of the motors when operating the same as generators; a set of switches 31 to 42, inclusive, for adjusting the connections of the motors with the main auto-transformer 1; a set of switches 43 to 52, inclusive, for governing the connections of the field magnet windings of the motors with the main auto-transformer winding when the motors are operated as generators; three choke coils 53, 54 and 55 that are arranged as set forth in Patent No. 834,525, granted October 30, 1906, to the Westinghouse Electric & Manufacturing Company, as assignee of Ray P.

Jackson, for the purpose of preventing injurious arcing at the switches 31 to 42, inclusive, when adjusting the connections of the motors with the main auto-transformer winding; three other choke coils 56, 57 and 58 that are similarly arranged and are interposed between the switches 43 to 52, inclusive, and field magnet winding 10; operating or controlling magnet windings 60 for each of said switches; a reversing switch for governing the circuits of the magnet windings of switches 13 to 24, inclusive, the said reversing switch comprising stationary contact terminals 61, 62 and 63 and movable conducting segments 64 and 65 adapted to be moved into engagement therewith; a master controller for governing the circuits of the remaining operating or controlling magnet windings 60, the said master controller comprising stationary contact terminals 66 to 89, inclusive, a movable conducting segment 90 that, for motor operation, is adapted to engage the said stationary contact terminals upon position-indicating lines *a* to *l*, inclusive, and a movable conducting segment 91 that is adapted to engage the stationary contact terminals upon position-indicating lines *a'* to *r'*, inclusive, in order to cause the motors to operate as generators; a switch 92 interposed in the circuits of the operating or controlling magnet windings of the switches 25 and 28 and having an operating or controlling magnet winding 93 that is connected between one terminal of the motor armature 5 and the neutral point of the choke coil 55, the said switch closing, and in turn permitting closure of switches 25 and 28 so as to connect the armatures 5 and 6 to the neutral point of the choke coil 55, only when the electromotive forces generated by said armatures is approximately equal to the voltage of the neutral point of the choke coil 55; an ammeter or other suitable current indicating device 94 that is included in series circuit with the armatures 5 and 6 when the motors are operated as generators; and a battery or other suitable source of energy 95 from which the operating or controlling magnet windings of all of the switches except switch 92 are supplied.

In the operation of the system, the reversing switch is first operated to cause the one or the other of the conducting segments 64 and 65 to engage the corresponding stationary contact terminals, operating or controlling magnet windings of switches 13, 16, 17, 20, 21 and 24 being energized and causing closure of the said switches for forward direction of rotation of the motors, and the magnet windings of switches 14, 15, 18, 19, 22 and 23 being energized and causing closure of the said switches for reverse operation of the motors. The conducting segment 90 of the master controller is then moved into engagement with the corresponding opposite stationary contact fingers until the desired voltage is applied to the motors, the structure and form of the said segment being such that when it occupies the position *a*, switch 31 is closed and as it moves through positions *b*, *c*, and *d*, switches 32, 33 and 34 are closed successively. As the controller is moved to succeeding positions, switches 35 to 42, inclusive, close in succession and switches 31 to 38 open in succession. Since terminals of the magnet windings of the switches 31 to 42, inclusive, are connected, respectively, to stationary contact terminals 67 to 78, inclusive, of the master controller and also since this portion of the system is fully described in the above-mentioned patent, No. 834,525, the circuits may be readily traced and will be readily understood without further description.

If it is desired to operate the motors as generators when the vehicle upon which the motors are employed is approaching a stop or is coasting or descending a grade, the conducting segment 91 of the master controller should be moved into engagement with the corresponding opposite stationary contact fingers, the reversing switch having first been moved to its "off" position, whereupon a circuit becomes established from one terminal of the battery 95 through stationary contact fingers 66, conducting segment 91, contact finger 79, and magnet windings of the switches 26, 27, 29 and 30, back to the other terminal of the battery 95, the switches 26, 27, 29 and 30 being thereby caused to close. By reason of the engagement of the conducting segment 91 with stationary contact fingers 75, 76, 77 and 78, switches 39 to 42, inclusive, are caused to close, and by reason of the engagement of the segment 91 with contact finger 80, the switch 43 is also caused to close. Closing of the switches 26 and 43 connects the field magnet winding 10 between suitable low-voltage points of the main transformer winding 1, and the closing of switches 27, 29 and 30 connects the field magnet windings 11 and 12 in series relation between the terminals of the armature 4, the motor comprising armature 4 and field magnet winding 10, thus serving as an exciter generator for the field magnet windings of the remaining motors. One terminal of each of the magnet windings of switches 25 and 28 is connected to the stationary contact terminal 79 of the master controller so that when the conducting segment 91 engages therewith, the magnet windings are connected to one terminal of the battery 95. The circuit connecting the said magnet windings to the other terminal of the battery 95 is interrupted when the switch 92 is open, the said switch being permitted to close only when the electromotive force generated by the armatures 5 and 6 approximates the voltage between the neutral point of the choke coil 55 and the track rail 3. When the switch 92 permits the switches 25 and 28 to close, the armatures 5 and 6 become connected to the main auto-transformer winding through the choke coils 53, 54 and 55 and the switches 39 to 42, inclusive, the arrangement of the system being then as indicated in Fig. 3. It will be noted that when the master controller occupies the position $a'$, which is the first braking position, and that usually occupied by the controller when the speed of the motors and the generated voltage are greatest, the armatures 5 and 6 are connected between high-voltage points of the main transformer winding 1, while the field magnet winding 10 is connected between low-voltage points.

As the speed of the motors decreases with decrease of speed of the vehicle in connection with which they are employed, the conducting segment 91 of the master controller should be moved to the succeeding positions $b'$, $c'$, $d'$, etc., so as to maintain the electromotive force generated by the armatures 5 and 6 approximately equal to the voltage between the neutral point of the choke coil 55 and the track rail 3. As the segment 91 is moved from position $a'$ to position $g'$, this result is effected by causing successive closure of switches 44 to 49, inclusive, and thereby altering the connections between the field magnet winding 10 and the main transformer winding 1 to cause an increase of the voltage applied to the field magnet winding. The circuits of the magnet windings of switches 43 to 52, inclusive, may be readily traced, since they are all similar and pass directly from one terminal of the battery 95 through stationary contact finger 66, conducting segment 91 and contact fingers 80 to 89, inclusive, to the said windings, and then back to the other terminal 95. The order of closure of the switches when operating the motors as generators may be readily understood from a consideration of the chart of Fig. 2, in which the reference numerals correspond to those of the switches, the reference letters to the positions of the master controller, and the small circles indicate the switches that are closed in each position of the controller.

As the speed of the motors decreases further, the segment 91 should be moved through the succeeding positions $h'$ to $r'$, inclusive, switch 38 being caused to close and switch 42 being caused to open when the controller occupies the position $h'$, thereby reducing the voltage at the intermediate point of the choke coil 55. As the controller is moved to positions $i'$, $j'$, $k'$ and $l'$, a balance between the voltage generated by the armatures 5 and 6 and the voltage at the intermediate point of the choke coil 55 is effected by alternately increasing the voltage applied to the field magnet winding 10 and the voltage of the intermediate point of the choke coil 55, it being deemed unnecessary to trace the circuits in detail for each of these steps, since the circuits may be readily traced on account of their simplicity and their similarity to those already described. The order of closure of the switches may also be readily understood from a consideration of the chart of Fig. 2. As the controller is moved from position $m'$ to position $r'$, the switches 49, 50, 51 and 52 remain closed and the voltage applied to the field magnet winding 10 remains constant, while switches 35, 34, 33, 32 and 31 are caused to close in succession, and switches 39, 38, 37, 36 and 35 are caused to open in succession, the voltage of the intermediate point of the choke coil 55 being thereby gradually reduced.

In order that the operation of the motors as generators may cause a uniform retardation of the vehicle upon which the motors are employed, and also in order that a uniform load may be maintained upon the motors, the voltage applied to the field magnet winding 10 of the exciter and the points of connection of the armatures 5 and 6 to the main transformer winding 1 are so adjusted with respect to each other that the current supplied by the armatures 5 and 6 to the main transformer winding will be maintained substantially constant, and the order of closure of the switches, as indicated by the diagram of Fig. 2, is intended to be such as to effect this result. In order to provide some indication of the amount of current supplied by the armatures 5 and 6 to the main transformer winding 1, an ammeter 94 may be included in circuit with the said armatures.

In Fig. 1, the operation of the motors as generators is controlled manually by means of the segment 91 of the master controller, but this may be done automatically, as in Fig. 4, thus placing the operation of the motors, when running as generators, beyond the control of the attendant. Many of the reference numerals employed in Fig. 1 have been applied to similar parts in Fig. 4, and the system has been materially simplified by reducing the number of switches connecting the points of subdivision of the main transformer winding, and by omitting the choke coils 53 to 58, inclusive, which, however, it will usually be found desirable to employ in practice. Switches 101 to 105, inclusive, are employed to connect the motors to the main transformer winding for motor operation, and the armatures 5 and 6 to the transformer winding for generator operation, while switches 106 to 110, inclusive, connect the field magnet winding 10 to suitable points of subdivision of the main transformer winding 1 when operating the motor as generators. The switches 101 to 110, inclusive, are provided, respectively, with operating or controlling magnet windings 111 to 120, inclusive, terminals of the magnet windings 111 to 115, inclusive, being connected, respectively, to stationary contact terminals 121 to 125, inclusive, of a master controller, that comprises also, movable conducting segments 126 and 160 adapted to engage the stationary contact terminals of the controller upon position-indicating lines *a* to *e*, inclusive, for motor operation, and a segment 127 adapted to engage the stationary contact terminals for generator operation. Terminals of each of magnet windings of the switches 25 to 30, inclusive, are connected to contact terminal 128 of the master controller, and terminals of each magnet winding 116 to 120, inclusive, are connected to contact terminal 129. Switch 92, that is closed only when the voltage generated by the armatures 5 and 6 approximates that of the point of the main transformer winding 1 to which the said armatures are to be connected, is interposed, as in Fig. 1, in circuit with the magnet windings of the switches 25 and 28. The order of closure of the switches 111 to 120, inclusive, when operating the machines as generators, is governed by means of interlocking switches 130 to 158, inclusive, comprising a corresponding number of pairs of stationary contact terminals and bridging pieces that are carried by the switches 101 to 110, inclusive.

In order to cause the motors to propel the vehicle on which they may be employed, the reversing switch should be moved to either its forward or reverse position, and the master controller should then be moved to one of the positions indicated by the lines *a* to *e*, inclusive. If the master controller occupies the position *a*, a circuit is established from one terminal of the battery 95 through contact terminal 162 of the master controller, conducting segment 126, stationary contact finger 121, operating magnet winding 111, contact finger 163, conducting segment 160, terminal 164, and back to the other terminal of the battery 95, the switch 101 being thereby caused to close. As the master controller is moved through the succeeding positions *b* to *e*, inclusive, switches 102 to 105, inclusive, are closed in succession, and switches 101 to 104, inclusive, open in succession, the circuits established being similar to that just described for the magnet winding 111.

In order to cause the machines to operate as generators and supply current to the transformer winding 1, segment 127 of the master controller should be moved into engagement with the corresponding opposite stationary contact terminals, the reversing switch having first been moved to its "off" position. A circuit is then established from one terminal of the battery 95 through terminal 162, segment 127, terminal 128 and magnet windings of switches 25 to 30, inclusive, it being understood, however, that the switch 92 interrupts the circuits of the magnet windings of switches 25 and 28, unless the voltage generated by the armatures 5 and 6 approximates that of the point in the transformer winding 1 to which the said armatures are to be connected. A second circuit is also established by way of devices bearing reference characters 95, 162, 127, 125, 115, 140 and 161, to energize the magnet winding 115 and thus effect closure of the switch 105. A third circuit is established from the master controller contact 129 by way of devices 116, 146 and 161 to energize the magnet winding 116 and thus effect closure of the switch 106. Circuits are then established as indicated in Fig. 3, in case the voltage generated by the armatures 5 and 6 approximates that of the point in the transformer winding 1 to which the switch 105 is connected, and also in case the amount of current traversing the armatures 5 and 6 and operating magnet winding 167 for the switch 161 does not exceed a predetermined amount, the switch 161 serving to interrupt the circuits described when the current supplied to the transformer exceeds a predetermined amount.

If both of switches 92 and 161 remain closed, another circuit will be established upon closure of the switch 106 from contact terminal 129 by way of magnet winding 117 and interlocking switch 144, switch 107 being thereby caused to close. If the switches 92 and 161 still remain closed, a circuit is established, upon closure of the switch 107, from contact terminal 129 through magnet winding 118 and interlocking switch 147, whereupon switch 108 closes. When the switch 108 closes, a circuit is established from terminal 124 by way of devices 114, 143, 150 and 161, switch 104 being closed because of the energization of the magnet winding 114. When the switch 104 closes, a circuit is established from contact terminal 129 by way of devices 119, 151, 141 and 161, and the switch 109 will thereupon be caused to close. Closure of the switch 109 causes a circuit to be established by way of devices 123, 113, 142, 154 and 161 to energize magnet winding 113 and thus cause the switch 103 to close. Closure of the switch 103 causes a circuit to be established by way of devices 129, 120, 155, 137 and 161, and the switch 110 is thereupon caused to close, which, in turn, establishes the circuit of magnet winding 112, which circuit includes devices 138 and 158. Magnet winding 112, when energized, causes closure of the switch 102, and a circuit is established by way of devices 121, 111, 134 and 161, switch 101 being caused to close upon energization of the magnet winding 111. It will thus be seen that the switches 101 to 110, inclusive, are caused to close only in a predetermined order, and according to the present invention, the order of closure is such that the field magnet winding 10 and armatures 5 and 6 connect to such points of the transformer winding 1 that the current supplied to the transformer winding by the armatures 5 and 6 may remain substantially constant and may not exceed a predetermined amount. This result is effected by means of a switch 161, which is opened by the magnet winding 167 included in series circuit with the armatures 5 and 6 when the current exceeds a predetermined amount. When the switch 161 is closed, and when the switch 92 is also closed, the switches 101 to 110, inclusive, may close in a predetermined order without interruption, but when it is open, further operation of the switches 101 to 110 is prevented until the current becomes less than the predetermined amount.

I claim as my invention:

1. In a system of control, the combination with a subdivided transformer winding, and a plurality of dynamo-electric machines having field magnets and armature windings, one machine serving as an exciter and having its armature connected to the field magnet winding of the remaining machines, of means for connecting the field magnet winding of the exciting machine and the armatures of the remaining machine to the transformer winding, and means for automatically so adjusting the points of connection of the said parts with the transformer winding that the current supplied to the transformer winding will remain substantially constant.

2. In a system of control, the combination with a subdivided transformer winding, and a plurality of dynamo-electric machines having field magnets and armature windings, one machine serving as an exciter and having its armature connected to the field magnet winding of the remaining machines, of means for connecting the field magnet winding of the exciting machine and the armatures of the remaining machines to such points of the transformer winding that the current supplied to the transformer winding will remain substantially constant.

3. In a system of control, the combination with a subdivided transformer winding, and a plurality of dynamo-electric machines having field magnet and armature windings, one machine serving as an exciter and having its armature connected to the field magnet winding of the remaining machines, of means for connecting the field magnet winding of the exciting machine and the armatures of the remaining machines to such points of the transformer winding that the current supplied to the transformer winding will remain substantially constant, and means for preventing the said armatures from becoming connected to the transformer winding except when the voltage generated thereby is approximately the same as that of the point in the transformer winding to which it is to be connected.

4. In a system of control, the combination with a subdivided transformer winding, and a plurality of dynamo-electric machines having field magnet and armature windings, one machine serving as an exciter and having its armature connected to the field magnet winding of the remaining machines, of means for connecting the field magnet winding of the exciting machines and the armature of the remaining machine to the transformer winding, means for automatically so adjusting the points of connection of said parts with the transformer winding that the current supplied to the transformer winding will remain substantially constant, and means for preventing the said armatures from becoming connected to the transformer winding except when the voltage generated thereby is approximately the same as that of the point in the transformer winding to which it is to be connected.

In testimony whereof, I have hereunto subscribed my name this 28th day of Feb., 1910.

WILLIAM COOPER.

Witnesses:
W. L. Waters,
B. B. Hines.